United States Patent
Ijdo et al.

(10) Patent No.: US 10,696,862 B2
(45) Date of Patent: Jun. 30, 2020

(54) POLYAMIDE COMPOSITIONS FOR SEALANTS AND HIGH SOLIDS PAINTS

(71) Applicant: Elementis Specialties, Inc., East Windsor, NJ (US)

(72) Inventors: Wouter Ijdo, Yardley, PA (US); Yanhui Chen, Princeton, NJ (US); James Heck, Robbinsville, NJ (US); Carlos Feito, Pulheim (DE); Elke Piron, Krefeld (DE)

(73) Assignee: Elementis Specialties, Inc., East Windsor, NJ (US)

( * ) Notice: Subject to any disclaimer, the term of this patent is extended or adjusted under 35 U.S.C. 154(b) by 0 days.

(21) Appl. No.: 16/546,878

(22) Filed: Aug. 21, 2019

(65) Prior Publication Data

US 2019/0375962 A1    Dec. 12, 2019

Related U.S. Application Data

(63) Continuation of application No. 15/223,641, filed on Jul. 29, 2016, now abandoned.

(60) Provisional application No. 62/214,487, filed on Sep. 4, 2015, provisional application No. 62/199,499, filed on Jul. 31, 2015.

(51) Int. Cl.
| | | |
|---|---|---|
| *C09D 163/00* | (2006.01) | |
| *C09D 7/65* | (2018.01) | |
| *C09D 7/43* | (2018.01) | |
| *C09D 171/02* | (2006.01) | |
| *C09J 11/08* | (2006.01) | |
| *C08G 65/336* | (2006.01) | |

(52) U.S. Cl.
CPC .......... *C09D 163/00* (2013.01); *C08G 65/336* (2013.01); *C09D 7/43* (2018.01); *C09D 7/65* (2018.01); *C09D 171/02* (2013.01); *C09J 11/08* (2013.01)

(58) Field of Classification Search
CPC .......... C09D 163/00; C09D 7/65; C09D 7/43; C09D 171/02; C08G 65/336; C09J 11/08
USPC ....................................................... 524/413
See application file for complete search history.

(56) References Cited

U.S. PATENT DOCUMENTS

| | | |
|---|---|---|
| RE41,588 E | 8/2010 | Santhanam et al. |
| 2008/0153924 A1 | 6/2008 | Caron et al. |
| 2008/0287574 A1 | 11/2008 | Loth et al. |
| 2010/0286419 A1* | 11/2010 | Santhanam .......... C09D 163/00 554/107 |
| 2013/0130953 A1 | 5/2013 | Spagnoli et al. |

FOREIGN PATENT DOCUMENTS

| | | |
|---|---|---|
| CN | 101568581 A | 10/2009 |
| JP | 56112977 A | 9/1981 |
| JP | 6315876 A | 1/1988 |
| JP | 63235381 A | 9/1988 |

OTHER PUBLICATIONS

Maisonneuve et al., "Structure-properties relationship of fatty acide-based thermoplastics as synthetic polymer mimics", Polym. Chem., vol. 4, pp. 5472-5517 (2013).

* cited by examiner

*Primary Examiner* — Kelechi C Egwim
(74) *Attorney, Agent, or Firm* — Morgan, Lewis & Bockius LLP

(57) ABSTRACT

A polyamide composition for use in sealants, adhesives and high solids coatings.

9 Claims, No Drawings

POLYAMIDE COMPOSITIONS FOR SEALANTS AND HIGH SOLIDS PAINTS

CROSS-REFERENCE TO RELATED APPLICATIONS

CROSS-REFERENCE TO RELATED APPLICATIONS

The application is a continuation of prior U.S. application Ser. No. 15/223641, filed Jul. 29, 2016 which claims priority benefit from U.S. Provisional Patent Application 62/199,499 filed Jul. 31, 2015 and U.S. Provisional Patent Application 62/214,487 filed Sep. 4, 2015, each of which is incorporated by reference herein in its entirety.

FIELD OF THE INVENTION

The present invention relates a polyamide composition and the use of such a polyamide composition as a rheological additive in sealants, adhesives, and high solids coating systems.

BACKGROUND OF THE INVENTION

Hydrogenated castor oil is a good organic thixotrope or "rheological additive" (RA) because it provides excellent performance when the additive is dispersed and activated in a specific manner. The rheological additive provides anti-settling effects, and controls flow and leveling as well as the degree of sagging in paints and coatings. The glyceride moiety in castor wax can be replaced by amine functional materials to yield wax like amides of 12-hydroxy stearic acid. These amides are also quite effective as rheological control agents, and they complement hydrogenated castor oil to yield an effective castor wax portfolio of materials for the paint formulator to choose from. The castor derived 12-hydroxystearic acid moiety is an effective rheological component because it can self-assemble into spatially preferred structures, some of which extend throughout the formulation and effectively trap solvent and/or resin and thereby control the material flow.

Prior art polyamide based rheological additives have specific processing temperature requirements that are related to the solvency effects present in a paint system or a sealant system. Therefore, the most appropriate choice of polyamide rheological additives for any given system depends on solvent type(s), processing temperature control and the manufacturing equipment. An optimal combination of these parameters allows for the most effective level of colloidal dispersion and yields a rheologically active network.

However, problems can arise when the paint processing temperature is too high for the additive—the polyamide rheological additive can dissolve completely at these elevated temperatures and later on, as the system cools down, the additive can precipitate and form semi-crystalline particulate matter, which is sometimes also referred to as "seeds". A similar seeding situation can occur when the solvent/temperature combination is too strong. The immediate seeding effect typically can be observed relatively quickly. A more complex seeding situation may occur when the additive is not processed enough or not enough solvent is present. In these cases potentially, not all powdered wax material has been converted into the desirable rheologically active form and unused material remains behind, often unnoticed at the point of paint manufacture. Over time upon storage, this unused additive material can transform under the influence of solvent, ambient temperature and time, to yield particles that lead to loss of fineness of grind and reduced gloss of the paint system, or activate overtime to become rheologically active.

For sealant, adhesive and coating compositions, long term storage above room temperature can lead to activation of the unactive polyamide additive which results in an undesirable increase in viscosity of such composition.

The present invention provides for rheological additives that activate easily and can be used in high solids paint systems or MS polymer sealants.

SUMMARY OF THE INVENTION

In one embodiment, the present disclosure provides for a polyamide composition consisting essentially of or consisting of a polyamide having groups derived from: a diamine selected from the group consisting of ethylene diamine and hexamethylene diamine; a straight chain monocarboxylic acid having 1 to 5 carbon atoms; a fatty acid independently selected from the group consisting of: 12-hydroxystearic acid, lesquerolic acid and combinations thereof; wherein the diamine, the straight chain monocarboxylic acid and fatty acid have a molar equivalent ratio ranging from 1:1.75:0.25 to 1:0.75:1.25; or 1:1.5:0.5 to 1:1:1; and a median particle size ranging from 1 μm to 10 μm. In some such embodiments, the straight chain monocarboxylic acid is independently selected from the group consisting of: acetic acid, propionic acid, butyric acid, valeric acid, and combinations thereof.

In certain embodiments of the polyamide, the diamine is ethylene diamine, the straight chain monocarboxylic acid is acetic acid and the fatty acid is 12-hydroxystearic acid wherein ethylene diamine, acetic acid and 12-hydroxystearic acid have a molar equivalent ratio ranging from 1:1.75:0.25 to 1:0.75:1.25; or 1:1.5:0.5 to 1:1:1.

In certain embodiments of the polyamide, the diamine is ethylene diamine, the straight chain monocarboxylic acid is propionic acid and the fatty acid is 12-hydroxystearic acid, wherein ethylene diamine, proprionic acid and 12-hydroxystearic acid have a molar equivalent ratio ranging from 1:1.75:0.25 to 1:0.75:1.25; or 1:1.5:0.5 to 1:1:1.

In each of the foregoing embodiments of polyamides, the median particle size may range from 3 μm to 7 μm.

In another embodiment, the present disclosure provides for a curable sealant or adhesive composition comprising a resin; an optional catalyst or optional curing agent or optional solvent, a polyamide composition having a median particle size ranging from 1 μm to 10 μm; or 3 μm to 7 μm; wherein the polyamide composition has an activation temperature ranging between 25° C. and 50° C.; or 30° C. and 45° C. in curable sealant or adhesive composition. In another embodiment, the present disclosure provides for a method of making a curable sealant or adhesive composition. In some embodiments of the curable sealant or adhesive composition and its method of making, the resin is a silyl-terminated polymer independently selected from the group consisting of: silylated polyurethane, silylated polyether polyol, silylated polyester, silylated polybutadiene, and combinations thereof. Such polymers are known in the art as MS-Polymers and SPUR. In such embodiment, the curable sealant or adhesive composition is moisture curable.

In yet another embodiment, the present disclosure provides for a high solids coating composition comprising: a first pack and a second pack; wherein the first pack comprises: (a) at least one resin (b) a polyamide composition; and (c) a diluent; and the second pack comprises: at least one cross linking agent; wherein the high solids composition has a solids content of at least 70 wt. %, and wherein the polyamide is activated upon mixing the ingredients of pack one between 25° C. and 50° C.

DETAILED DESCRIPTION OF THE EMBODIMENTS

The present disclosure provides for a polyamide composition and its use as a rheology modifier in one and two component sealant and adhesive compositions, such as silylated polymer sealant compositions, and paint compositions including high solids and 100% solids paint. A skilled person would understand that a polyamide has two or more amide groups.

In current manufacturing processing of sealant, adhesive and coating compositions, the processing conditions are adjusted (temperature, shear rate, time) to accommodate the characteristics of the commercially available polyamide rheological additives. Various embodiments of rheological additives are described herein to allow for manufacturing processes that can yield cost savings by reducing production time and energy costs (such as no additional heat requirement).

Furthermore, paint manufacturers are moving to higher solids paint formulations, to avoid volatile organic diluents. Therefore, there is less organic solvent to facilitate incorporation and/or activation of rheological additives in such systems. The present disclosure provides for various embodiments of polyamides which avoid the necessity of pre-activation in organic solvents.

In one embodiment, the present disclosure provides for a polyamide composition consisting essentially of a polyamide having groups derived from: a diamine independently selected from the group consisting of ethylene diamine and hexamethylene diamine; a straight chain monocarboxylic acid having 1 to 5 carbon atoms; a fatty acid independently selected from the group consisting of: 12-hydroxystearic acid, lesquerolic acid and combinations thereof; wherein the diamine, the straight chain monocarboxylic acid and fatty acid have a molar equivalent ratio ranging from 1:1.75:0.25 to 1:0.75:1.25; or 1:1.5:0.5 to 1:1:1; and a median particle size ranging from 1 μm to 10 μm. In some of the foregoing embodiments, the straight chain monocarboxylic acid is independently selected from the group consisting of: acetic acid, propionic acid, butyric acid, valeric acid, and combinations thereof. In certain of the foregoing embodiments, the straight chain monocarboxylic acid is independently selected from the group consisting of: acetic acid, propionic acid, and combinations thereof.

A skilled person would understand that 12-hydroxystearic acid is derived from castor oil, and typically is not 100% hydroxystearic acid.

In certain embodiments, the composition consists essentially of a polyamide wherein the diamine is ethylene diamine, the straight chain monocarboxylic acid is acetic acid and the fatty acid is 12-hydroxystearic acid wherein ethylene diamine, acetic acid and 12-hydroxystearic acid have a molar equivalent ratio ranging from 1:1.75:0.25 to 1:0.75:1.25; or 1:1.5:0.5 to 1:1:1.

In certain embodiments, the composition consists essentially of a polyamide wherein the diamine is ethylene diamine, the straight chain monocarboxylic acid is propionic acid and the fatty acid is 12-hydroxystearic acid wherein ethylene diamine, propionic acid and 12-hydroxystearic acid have a molar equivalent ratio ranging from 1:1.75:0.25 to 1:0.75:1.25; or 1:1.5:0.5 to 1:1:1.

In some of the foregoing embodiments, the median particle size, of the polyamide, may range from 3 μm to 7 μm.

For the purposes of this application, "consisting essentially of" shall mean materials which do not materially affect the basic and novel characteristic of the polyamide. Materials which may materially affect the basic and novel characteristic of the polyamide include, but not limited to: polyamides based on 12-hydroxystearic acid, polyamines and monocarboxylic acids with more than 7 carbon atoms; and mixtures of polyamides based on (i) 12-hydroxystearic acid, polyamines and monocarboxylic acids with more than 7 carbon atoms and (ii) 12-hydroxystearic acid, polyamines and monocarboxylic acids with 3-4 carbon atoms. Materials which also may materially affect the basic and novel characteristic of the polyamide include those that increase the activation temperature of a high solids paint composition or sealant composition containing the polyamide.

For the purposes of this application, "activation" shall mean a transformation where the polyamide is physically transformed into a form which imparts thixotropic behavior. Temperature or other forms of energy input can facilitate this activation. In one embodiment, the physical transformation is from powder like material to material with fiber like morphology.

In one embodiment, the present disclosure provides for a polyamide composition consisting of a polyamide having groups derived from: a diamine selected from the group consisting of ethylene diamine and hexamethylene diamine; a straight chain monocarboxylic acid having 1 to 5 carbon atoms; a fatty acid independently selected from the group consisting of: 12-hydroxystearic acid, lesquerolic acid and combinations thereof; wherein the diamine, the straight chain monocarboxylic acid and fatty acid have a molar equivalent ratio ranging from 1:1.75:0.25 to 1:0.75:1.25; or 1:1.5:0.5 to 1:1:1; and a median particle size ranging from 1 μm to 10 μm. In certain of the foregoing embodiments, the straight chain monocarboxylic acid is independently selected from the group consisting of: acetic acid, propionic acid, butyric acid, valeric acid, and combinations thereof. In certain of the foregoing embodiments, the straight chain monocarboxylic acid is independently selected from the group consisting of: acetic acid, propionic acid, and combinations thereof.

In some embodiments, the composition consists of a polyamide wherein the diamine is ethylene diamine, the straight chain monocarboxylic acid is acetic acid and the fatty acid is 12-hydroxystearic acid wherein ethylene diamine, acetic acid and 12-hydroxystearic acid have a molar equivalent ratio ranging from 1:1.75:0.25 to 1:0.75:1.25; or 1:1.5:0.5 to 1:1:1.

In some embodiments, the composition consists of a polyamide wherein the diamine is ethylene diamine, the straight chain monocarboxylic acid is propionic acid and the fatty acid is 12-hydroxystearic acid wherein ethylene diamine, propionic acid and 12-hydroxystearic acid have a molar equivalent ratio ranging from 1:1.75:0.25 to 1:0.75:1.25; or 1:1.5:0.5 to 1:1:1.

In some of the foregoing embodiments, the median particle size, of the polyamide, may range from 3 μm to 7 μm.

In another embodiment, the present disclosure provides for a curable sealant or adhesive composition comprising a resin; an optional catalyst or optional curing agent or optional solvent, a polyamide composition having a median particle size ranging from 1 μm to 10 μm; or 3 μm to 7 μm; wherein the polyamide composition has an activation temperature ranging between 25° C. and 50° C.; or 30° C. and 45° C. in curable sealant or adhesive composition. In another embodiment, the present disclosure provides for a method of making a curable sealant or adhesive composition. The method comprises the steps of: adding a polyamide composition to a resin; blending the mixture of the polyamide and the resin at a temperature ranging between 25° C. and 50° C. In such embodiments, the amount of polyamide composition may range from 0.5 wt. % to 3 wt. %. In some other such embodiments, the amount of catalyst may range from 0.1 wt. % to 1.0 wt. %.

In another embodiment, the present disclosure provides for a curable sealant or adhesive composition, the composition is contained in a one or two pack system. For the two pack system, the resin and polyamide according to the various embodiments described herein, and other components, described herein below, are contained in one pack; and a catalyst or curing agent, and optional components, are contained in the second pack. For the one pack system, the resin and polyamide according to the various embodiments described herein, catalyst and/or curing agent, optional pigment, filler and plasticizer, and other components described herein below, are contained in one pack. The various embodiments of one pack curable sealant or adhesive composition, described herein, may be substantially water free. For the purposes of this application, substantially water free may mean water content that cannot be measured by standard methods such as Karl Fischer.

In some embodiments of a one part curable sealant or adhesive composition and its method of making, the resin is selected from silicone, polyurethane systems and the catalyst or curing agent are included in the composition. In some embodiments of a one part curable sealant or adhesive composition and its method of making, the resin is selected from acrylic and butyl rubber solvent based resins without a catalyst or curing agent. In some embodiments of a two part curable sealant or adhesive composition and its method of making, the resin is selected from epoxy resin, epoxy-penetrating solvent-based resin, silicone resin, and polyurethane resin.

In some embodiments of the curable sealant or adhesive composition and its method of making, the resin is a silyl-terminated polymer independently selected from the group consisting of: silylated polyurethane, silylated polyether polyol, silylated polyester, silylated polybutadiene, and combinations thereof. Such polymers are known in the art as MS-Polymers and SPUR. In such embodiment, the curable sealant or adhesive composition is moisture curable.

In some such embodiments of the curable sealant or adhesive composition, either one pack or two pack, and its method of making, the polyamide consists essentially of a polyamide having groups derived from: a diamine selected from the group consisting of ethylene diamine and hexamethylene diamine; a straight chain monocarboxylic acid having 1 to 6 carbon atoms; a fatty acid independently selected from the group consisting of: 12-hydroxystearic acid, lesquerolic acid and combinations thereof; wherein the diamine, the straight chain monocarboxylic acid and fatty acid have a molar equivalent ratio ranging from 1:1.75:0.25 to 1:0.75:1.25; or 1:1.5:0.5 to 1:1:1. In some such embodiments of the polyamide of the curable sealant or adhesive composition, the straight chain monocarboxylic acid is independently selected from the group consisting of: propionic acid, butyric acid, valeric acid, hexanoic acid and combinations thereof. In certain of the embodiments of the polyamide of the curable sealant or adhesive composition, the straight chain monocarboxylic acid is independently selected from the group consisting of: acetic acid, propionic acid, and combinations thereof.

In some embodiments of the curable sealant or adhesive composition, the polyamide consists essentially of groups wherein, the diamine is ethylene diamine, the straight chain monocarboxylic acid is acetic acid and the fatty acid is 12-hydroxystearic acid wherein ethylene diamine, acetic acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions includes resins independently selected from epoxy, epoxy-penetrating solvent-based resin, polyurethane resin and combinations thereof. In some other instances, such curable sealant or adhesive compositions includes resins independently selected from silylated polyurethane, silylated polyether polyol, silylated polyester, silylated polybutadiene and combinations thereof.

In some embodiments of the curable sealant or adhesive composition the polyamide consists essentially of groups wherein, the diamine is ethylene diamine, the straight chain monocarboxylic acid is propionic acid and the fatty acid is 12-hydroxystearic acid wherein ethylene diamine, propionic acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In other embodiments of the curable sealant or adhesive composition the polyamide consists essentially of groups wherein the diamine is ethylene diamine, the straight chain monocarboxylic acid is butyric acid and the fatty acid is 12-hydroxystearic acid wherein ethylene diamine, butyric acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In some embodiments of the curable sealant or adhesive composition the polyamide consists essentially of groups wherein the diamine is ethylene diamine, the straight chain monocarboxylic acid is hexanoic acid and the fatty acid is 12-hydroxystearic acid wherein ethylene diamine, hexanoic acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In some other such embodiments of the curable sealant or adhesive composition and its method of making, the polyamide consists of a polyamide having groups derived from: a diamine selected from the group consisting of ethylene diamine and hexamethylene diamine; a straight chain monocarboxylic acid having 1 to 6 carbon atoms; a fatty acid independently selected from the group consisting of 12-hydroxystearic acid, lesquerolic acid and combinations thereof; wherein the diamine, the straight chain monocarboxylic acid and fatty acid have a molar equivalent ratio ranging from 1:1.75:0.25 to 1:0.75:1.25; or 1:1.5:0.5 to 1:1:1. In some such embodiments of the polyamide of the curable sealant or adhesive composition, the straight chain monocarboxylic acid is independently selected from the group consisting of propionic acid, butyric acid, valeric acid, hexanoic acid and combinations thereof. In certain of the embodiments of the polyamide of the curable sealant or adhesive composition, the straight chain monocarboxylic acid is independently selected from the group consisting of: acetic acid, propionic acid, and combinations thereof. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions may also include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In some embodiments of the curable sealant or adhesive composition the polyamide, consists of groups wherein, the diamine is ethylene diamine, the straight chain monocarboxylic acid is acetic acid and the fatty acid is 12-hydroxystearic acid wherein ethylene acetic acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In some embodiments of the curable sealant or adhesive composition the polyamide consists of groups wherein, the diamine is ethylene diamine, the straight chain monocarboxylic acid is propionic acid and the fatty acid is 12-hydroxystearic acid wherein ethylene diamine, propionic acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In other embodiments of the curable sealant or adhesive composition the polyamide consists of groups wherein, the diamine is ethylene diamine, the straight chain monocarboxylic acid is butyric acid and the fatty acid is 12-hydroxystearic acid wherein ethylene diamine, butyric acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In some embodiments of the curable sealant or adhesive composition the polyamide consists of groups wherein, the diamine is ethylene diamine, the straight chain monocarboxylic acid is hexanoic acid and the fatty acid is 12-hydroxystearic acid wherein ethylene diamine, hexanoic acid and 12-hydroxystearic acid have a molar equivalent ratio ranging from 1:1.75:0.25 to 1:0.75:1.25; or 1:1.5:0.5 to 1:1:1. Such polyamide composition may have a median particle size ranging from 1 µm to 10 µm; or 3 µm to 7 µm and the polyamide composition may have an activation temperature ranging between 25° C. and 50° C.; or 30° C. and 45° C. when combined with resin and optional solvent, pigment, filler and plasticizer. In some instances, such curable sealant or adhesive compositions include resins independently selected from epoxy, epoxy-penetrating solvent-based resin, polyurethane resin and combinations thereof. In some other instances, such curable sealant or adhesive compositions include resins independently selected from silylated polyurethane, silylated polyether polyol, silylated polyester, silylated polybutadiene and combinations thereof.

In some other such embodiments of the curable sealant or adhesive composition, either one part or two part, and its method of making, the catalyst, may be a condensation catalyst or hardening catalyst. Examples of catalysts or curing agents include tetrabutyl titanate and tetrapropyl titanate; organotin compounds such as dibutyltin dilaurate, dibutyltin maleate, dibutyltin diacetate, stannous octylate, stannous naphthenate, reaction products from dibutyltin oxide and phthalate esters, and dibutyltin diacetylacetonate; organoaluminum compounds such as aluminum trisacetylacetonate, aluminum tris(ethyl acetoacetate) and diisopropoxyaluminum ethyl acetoacetate; reaction products from bismuth salts and organic carboxylic acids, such as bismuth tris(2-ethylhexoate) and bismuth tris(neodecanoate); chelate compounds such as zirconium tetraacetylacetonate and titanium tetraacetylacetonate; organolead compounds such as lead octylate; organovanadium compounds; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo(5.4.0)undecene-7 (DBU). In one embodiment, the catalyst is an organotin compound such as dioctyltin dilaurate, dioctyltin dicarboxylate, dioctyltin dineodecanoate, or di-(n-butyl)tin bis-ketonate.

In some other such embodiments of the curable sealant or adhesive composition, either one part or two part, and its method of making, the composition may include one or more plasticizers. Examples of plasticizers include, phthalate ester plasticizers such as dimethyl phthalate, diethyl phthalate, dibutyl phthalate, diheptyl phthalate, dioctyl phthalate, diisononyl phthalate, diisodecyl phthalate, diisoundecyl phthalate, butyl benzyl phthalate, dilauryl phthalate and dicyclohexyl phthalate; epoxidized plasticizers such as epoxidized soybean oil, epoxidized linseed oil and benzyl epoxystearate; polyester plasticizers derived from dibasic acids and dihydric alcohols; polyethers such as polypropylene glycol and derivatives thereof; polystyrenes such as poly-.alpha.-methylstyrene and polystyrene; polybutadiene, butadiene-acrylonitrile copolymers, polychloroprene, polyisoprene, polybutene, chlorinated paraffins and the like.

In some other such embodiments of the curable sealant or adhesive composition, either one part or two part, and its method of making, the composition may optionally contain additives including dehydrating agents, tactifiers, physical property modifiers, storage stability improving agents, antioxidants, adhesion promoters, ultraviolet light absorbers, metal deactivators, antiozonants, light stabilizers, amine type radial chain inhibitors, phosphorous-containing peroxide decomposers, lubricants, pigments, foaming agents, flame retardants and antistatic agents.

The polyamide additive may be used to provide rheology control to solvent-borne coatings. Examples are conventional coatings, coatings that are formulated as one- or two-component pack high solids coating systems and 100% solids coatings such as UV curable coatings and powder coatings. In one embodiment of a coating composition containing the various embodiments of the polyamide described herein, the coating is based on a binder resin chemistry selected from the group consisting of polyester-melamine, polyester-urea/formaldehyde, alkyd-melamine, alkyd-urea/formaldehyde, acrylic-melamine, acrylic urea/formaldehyde, epoxies, epoxy urea/formaldehyde, epoxy/amines and epoxy/amides, polyurethanes, alkyd and acrylic modified urethane, uralkyds, urethane acrylates and urethane amide acrylates, high solids air-dry paints of alkyd and acrylic resin, vinyl toluated alkyds, chain stopped air-dry alkyds and modified alkyds, oleoresins, polyvinyl acetates and vinyl acrylics.

For the purposes of the present disclosure, the terms "high solids" and "high solids content" refer to solid contents of at least 70% by weight (wt. %), more preferably at least 80 wt. %, and most preferably at least 85 wt. %, based on the total weight of the coating composition after mixing both packs. The maximum solids content generally is not higher than 95 wt. %. The solids content of the composition can be determined in accordance with ASTM standard D 5201-01.

In one such embodiment, the present disclosure provides for a high solids coating composition comprising: a first pack and a second pack; wherein the first pack comprises: (a) at least one resin (b) a polyamide composition having a median particle size ranging from 1 μm to 10 μm; and (c) a diluent; and the second pack comprises: at least one cross linking agent; wherein the high solids composition has a solids content of at least 70 wt. %, and wherein the polyamide is activated upon mixing the ingredients of pack one between 25° C. and 50° C. Various embodiments of a polyamide composition are described below and may be used in the foregoing high solids coating composition.

In one such embodiment of a two pack high solids paint composition, the resin is an epoxy. In one such embodiment, the epoxy resin is selected from the group consisting of bisphenol A epoxy, bisphenol F epoxy, or phenolic novolac epoxy or combinations thereof. Such two component epoxy systems are cured with hardeners. In one embodiment, the hardener is selected from the group consisting of aliphatic polyamines, polyamine adducts, polyamide/amidoamines, aromatic amines, ketimines and cycloaliphatic amines and combinations thereof. In one embodiment, the epoxy system is formulated with reactive diluents to reduce the viscosity of the base resin based on bisphenol A, bisphenol F, or phenol novolac epoxy resins to improve handling and ease of processing in various applications. Reactive diluents typically are epoxy group-containing functional products which are low viscosity materials that can react with the curing agents to become a part of the cross-linked epoxy system. Reactive diluents are described in U.S. Pat. No. 4,417,022 and U.S. Patent Appl. Publ. No. 20050192400 each of which is incorporated by reference in their entirety.

In another embodiment of a two pack high solids paint composition with the resin in a first pack and the resin is a polyol which forms a polyurethane when reacted with a crosslinker in a second pack. In such embodiments, the polyol is a high molecular weight, high functionality polyol and the crosslinker is a low viscosity, high functionality liquid polyisocyanate crosslinker.

In some embodiments, of the high solids paint composition, the polyol resin is independently selected from the group consisting of: polyurethane polyol, a polyester polyol, a polyether polyol, a polyacrylate polyol, and combinations thereof. For such embodiments of high solids coating compositions, the amount of polyamide ranges from 0.5 wt. % to 2 wt. % and the amount of cross linking agent ranges from 10 wt. % to 20 wt. %.

Diluents which may be present in the coating composition include customary solvents, such as aromatic, aliphatic, araliphatic or cycloaliphatic hydrocarbons, partly or fully halogenated aromatic, aliphatic, araliphatic or cycloaliphatic hydrocarbons, alcohols such as methanol, ethanol, isopropanol, butanol, benzyl alcohol, diacetone alcohol, esters such as ethyl acetate, propyl acetate, butyl acetate, ether esters such as methoxypropyl acetate or butyl glycol acetate, ketones such as acetone, methyl ethyl ketone, methyl isobutyl ketone or cyclohexanone, strongly polar solvents such as dimethylformamide and water, and mixtures thereof. VOC exempt solvents may also be used a solvents.

The coating composition may optionally contain one or more auxiliary ingredients including plasticizers, stabilizers, phase mediators, pigments, surface-active substances, defoamers, biocides, desiccants, catalysts, initiators, photosensitizers, inhibitors, light stabilizers, and preservatives.

The cross-linking agent in pack two is selected according to the composition of the polyol resin. In some embodiments, the cross-linking agent is a diisocyanate or polyisocyanate. Examples of diisocyanate compounds include p-phenylene diisocyanate, biphenyl 4,4'-diisocyanate, toluene diisocyanate, tetramethylxylene diisocyanate, 3,3'-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis(phenyl isocyanate), 1,5 naphthalene diisocyanate, bis(isocyanato-ethyl fumarate), isophorone diisocyanate (IPDI) and methylene-bis-(4 cyclohexylisocyanate.

In some other embodiments, the formulation may contain an amine compound. Examples include butylamine, octylamine, dibutylamine, monoethanolamine, diethanolamine, triethanolamine, diethylenetriamine, triethylenetetramine, oleylamine, cyclohexylamine, benzylamine, diethylaminopropyline, xlylenedamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0))undecene-7 (DBU).

In some embodiments, of the high solids paint composition, the polyamide consists essentially of a polyamide having groups derived from: a diamine selected from the group consisting of ethylene diamine and hexamethylene diamine; a straight chain monocarboxylic acid having 1 to 6 carbon atoms; a fatty acid independently selected from the group consisting of: 12-hydroxystearic acid, lesquerolic acid and combinations thereof; wherein the diamine, the straight chain monocarboxylic acid and fatty acid have a molar equivalent ratio ranging from 1:1.75:0.25 to 1:0.75:1.25; or 1:1.5:0.5 to 1:1:1; and a median particle size ranging from 1 μm to 10 μm. In some embodiments of the polyamide of the high solids paint composition, the straight chain monocarboxylic acid is independently selected from the group consisting of: propionic acid, butyric acid, valeric acid, hexanoic acid and combinations thereof. In certain of the embodiments of the polyamide of the high solids paint composition, the straight chain monocarboxylic acid is independently selected from the group consisting of: acetic acid, propionic acid, and combinations thereof.

In some embodiments of the high solids paint composition, the polyamide consists essentially of groups wherein, the diamine is ethylene diamine, the straight chain monocarboxylic acid is acetic acid and the fatty acid is 12-hydroxystearic acid wherein ethylene diamine, acetic acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 μm to 10 μm.

In some embodiments of the high solids paint composition, the polyamide consists essentially of groups wherein, the diamine is ethylene diamine, the straight chain monocarboxylic acid is propionic acid and the fatty acid is 12-hydroxystearic acid wherein ethylene diamine, propionic acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 μm to 10 μm.

In other embodiments of the high solids paint composition, the polyamide consists essentially of groups wherein the diamine is ethylene diamine, the straight chain monocarboxylic acid is butyric acid and the fatty acid is 12-hydroxystearic acid wherein ethylene diamine, butyric acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 μm to 10 μm.

In some embodiments of the high solids paint composition, the polyamide consists essentially of groups wherein, the diamine is ethylene diamine, the straight chain monocarboxylic acid is hexanoic acid and the fatty acid is 12-hydroxystearic acid wherein ethylene diamine, hexanoic acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 μm to 10 μm.

In some other embodiments, of the high solids paint composition, the polyamide consists of a polyamide having groups derived from: a diamine selected from the group consisting of ethylene diamine and hexamethylene diamine; a straight chain monocarboxylic acid having 1 to 6 carbon atoms; a fatty acid independently selected from the group consisting of: 12-hydroxystearic acid, lesquerolic acid and combinations thereof; wherein the diamine, the straight chain monocarboxylic acid and fatty acid have a molar equivalent ratio ranging from 1:1.75:0.25 to 1:0.75:1.25; or 1:1.5:0.5 to 1:1:1; and a median particle size ranging from 1 μ to 10 μm. In some such embodiments of the polyamide, the straight chain monocarboxylic acid is independently selected from the group consisting of: propionic acid, butyric acid, valeric acid, hexanoic acid and combinations thereof. In certain of the embodiments of the polyamide of the high solids paint composition, the straight chain monocarboxylic acid is independently selected from the group consisting of: acetic acid, propionic acid, and combinations thereof.

In some embodiments of the high solids paint composition, the polyamide consists of groups wherein, the diamine is ethylene diamine, the straight chain monocarboxylic acid is acetic acid and the fatty acid is 12-hydroxystearic acid wherein ethylene diamine, acetic acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 μm to 10 μm.

In some embodiments of the high solids paint composition, the polyamide consists of groups wherein the diamine is ethylene diamine, the straight chain monocarboxylic acid is propionic acid and the fatty acid is 12-hydroxystearic acid wherein ethylene diamine, propionic acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 μm to 10 μm.

In other embodiments of the polyamide, the diamine is ethylene diamine, the straight chain monocarboxylic acid is butyric acid and the fatty acid is 12-hydroxystearic acid wherein ethylene diamine, butyric acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 μm to 10 μm.

In some embodiments of the high solids paint composition, the polyamide consists of groups wherein the diamine is ethylene diamine, the straight chain monocarboxylic acid is hexanoic acid and the fatty acid is 12-hydroxystearic acid wherein ethylene diamine, hexanoic acid and 12-hydroxystearic acid have a molar equivalent ratio ranging from 1:1.75:0.25 to 1:0.75:1.25; or 1:1.5:0.5 to 1:1:1 and said polyamide having a median particle size ranging from 1 µm to 10 µm.

EXAMPLES

The following examples further describe and demonstrate illustrative embodiments within the scope of the present invention. The examples are given solely for illustration and are not to be construed as limitations of this invention as many variations are possible without departing from the spirit and scope thereof.

Example 1

To a 500 ml, 4-neck glass reactor equipped with an overhead stirrer, a dean-stark trap, a condenser and thermocouple, 200.0 g (0.647 mole) of 12-hydroxystearic acid (HSA) and 75.2 g (0.647 mole) of hexanoic acid (HA) was added. The mixture was heated to 75-80° C. under $N_2$ until all material was molten. The reactor mixer was switch on and 38.9. g (0.647 mole) of ethylenediamine (ED) was slowly added to the reactor within 2-3 minutes. A typical exotherm increases the temperature to 135-140° C. After the temperature was held at 135° C. for 15-20 minutes, 0.13 g of phosphoric acid catalyst was added to the reactor. The reaction mixture was slowly heated to 180° C. and held for 5-6 hours until acid/amine numbers are about 5-8. The material was then removed from the reactor, cooled and milled to a fine powder with a median particle size between 1 and 10 microns. The amide composition is designated as HSA-ED-HA Example 2

To a 500 ml, 4-neck glass reactor equipped with an overhead stirrer, a dean-stark trap, a condenser and thermocouple, 100.0 g (0.323 mole) of 12-hydroxystearic acid (HSA) and 112.8 g (0.97 mole) of hexanoic acid (HA) was added. The mixture was heated to 75-80° C. under $N_2$ until all material was molten. The reactor mixer was switch on and 38.9. g (0.647 mole) of ethylenediamine (ED) was slowly added to the reactor within 2-3 minutes. A typical exotherm increases the temperature to 135-140° C. After the temperature was held at 135° C. for 15-20 minutes, 0.13 g of phosphoric acid catalyst was added to the reactor. The reaction mixture was slowly heated to 180° C. and held for 5-6 hours until acid/amine numbers are about 5-8. The material was then removed from the reactor, cooled and milled to a fine powder with a median particle size between 1 and 10 microns. The amide composition is designated as HSA-ED-HA (2).

Example 3

To a 500 ml, 4-neck glass reactor equipped with an overhead stirrer, a dean-stark trap, a condenser and thermocouple, 200.0 g (0.647 mole) of 12-hydroxystearic acid (HSA) and 47.8 g (0.647 mole) of proprionic acid (PA) was added. The mixture was heated to 75-80° C. under $N_2$ until all material was molten. The reactor mixer was switch on and 38.9. g (0.647 mole) of ethylenediamine (ED) was slowly added to the reactor within 2-3 minutes. A typical exotherm increases the temperature to 135-140° C. After the temperature was held at 135° C. for 15-20 minutes, 0.13 g of phosphoric acid catalyst was added to the reactor. The reaction mixture was slowly heated to 180° C. and held for 5-6 hours until acid/amine numbers are about 5-8. The material was then removed from the reactor, cooled and milled to a fine powder with a median particle size between 1 and 10 microns. The amide composition is designated as HSA-ED-PA (1).

Example 4

To a 500 ml, 4-neck glass reactor equipped with an overhead stirrer, a dean-stark trap, a condenser and thermocouple, 200.0 g (0.647 mole) of 12-hydroxystearic acid (HSA) and 38.8 g (0.647 mole) of acetic acid (AA) was added. The mixture was heated to 75-80° C. under $N_2$ until all material was molten. The reactor mixer was switch on and 38.9. g (0.647 mole) of ethylenediamine (ED) was slowly added to the reactor within 2-3 minutes. A typical exotherm increases the temperature to 135-140° C. After the temperature was held at 135° C. for 15-20 minutes, 0.13 g of phosphoric acid catalyst was added to the reactor. The reaction mixture was slowly heated to 180° C. and held for 5-6 hours until acid/amine numbers are about 5-8. The material was then removed from the reactor, cooled and milled to a fine powder with a median particle size between 1 and 10 microns. The amide composition is designated as HSA-ED-AA (1).

Example 5

To a 500 ml, 4-neck glass reactor equipped with an overhead stirrer, a dean-stark trap, a condenser and thermocouple, 200.0 g (0.647 mole) of 12-hydroxystearic acid (HSA) and 57.0 g (0.647 mole) of butyric acid (BA) was added. The mixture was heated to 75-80° C. under $N_2$ until all material was molten. The reactor mixer was switch on and 38.9. g (0.647 mole) of ethylenediamine (ED) was slowly added to the reactor within 2-3 minutes. A typical exotherm increases the temperature to 135-140° C. After the temperature was held at 135° C. for 15-20 minutes, 0.13 g of phosphoric acid catalyst was added to the reactor. The reaction mixture was slowly heated to 180° C. and held for 5-6 hours until acid/amine numbers are about 5-8. The material was then removed from the reactor, cooled and milled to a fine powder with a median particle size between 1 and 10 microns. The amide composition is designated as HSA-ED-BA (1).

Example 6

In this example, we compare the rheological performance of polyamide additives in a MS-polymer based sealant formulation, The rheological additives were compounded without applying heat. The MS Polymer sealant formulation is shown in Table 1 and the various ingredients were mixed in a planetary vacuum mixer Type LPV 1 following a mixing procedure appropriate for sealant production. A minimal temperature rise was observed due to mixing. The rheology of the final materials was measured with a MCR 300 rheometer from Physica. The measuring geometry was a plate-plate system (PP/PE 25). For rheology assessment on the MCR 300 rheometer, the MS Polymer sealant formulation was used without a catalyst.

TABLE 1

MS Polymer sealant formulation.

| # | Component | Wt parts | Function |
|---|---|---|---|
| 1 | MS-Polymer S 203 H | 15.00 | binder |
| 2 | Carbital 110 S | 50.00 | extender |
| 3 | Kronos 2190 | 1.00 | pigment |
| 4 | Rheological Additive | 3.50 | rheological additive |
| 5 | MS-Polymer S 303 H | 10.00 | binder |
| 6 | Jayflex DIUP | 16.50 | plasticiser |
| 7 | Dynasilan VTMO | 0.70 | water absorbent |
| 8 | Dynasilan DAMO-T | 0.50 | adhesion promoter |
| 9 | Metatin 740 | 0.30 | catalyst |

TABLE 2

Rheological performance of MS polymer sealant prepared with a polyamide additive loading at 1 wt % - additive activated without heating.

| Amide composition* | Shear rate, $s^{-1}$ | Viscosity, Pa | Shear thinning index | Yield point |
|---|---|---|---|---|
| HSA-ED-HA (1) | 0.1 | 1293 | 81 | 148 |
| HSA-ED-PA (1) | 0.1 | 2071 | 115 | 217 |
| HSA-ED-AA (1) | 0.1 | 687 | 49 | nm |

Nm = not measurable

The data in Table 2 demonstrates that with a low activation temperature, the MS Polymer sealant formulation with HSA-ED-PA (1) polyamide provided the highest viscosity, shear thinning index and yield point values. The MS Polymer sealant formulations with HSA-ED-HA (1) and HSA-ED-AA (1) polyamides provided lower viscosity, shear thinning index and yield point values but still imparted rheological activity.

Example 7

This example evaluates the rheological performance of MS polymer sealant material with general formulation as shown in Table 1, but compounded at 45° C. In addition, a 3.5 wt % polyamide additive loading was used to enhance performance differences. The results shown in Table 3 illustrate desirable performance when the amide formulation of HSA-ED-HA (1) is adjusted to the additive formulation of HSA-ED-HA (2). The HSA-ED-HA (2), and HSA-ED-PA (1) polyamide compositions show desirable rheological efficiency in comparison to HSA-ED-HA (1) and the industrial benchmark.

TABLE 3

| Amide composition* | Mol ratio | Viscosity at 0.1 s−1 | Viscosity at 100 s−1 | Shear thinning index |
|---|---|---|---|---|
| HSA-ED-HA (1) | 1:1:1 | 4938 | 29 | 170 |
| HSA-ED-HA (2) | 1:1.5:0.5 | 8444 | 32 | 264 |
| HSA-ED-PA (1) | 1:1:1 | 9464 | 35 | 270 |
| Industrial benchmark | na | 6331 | 32 | 198 |

Example 8

The rheological performance in a two component polyurethane paint was examined. Polyamides were evaluated for performance as rheological additive (RA) by incorporating them in a high solids two component polyurethane paint system with a formulation shown in Table 4. A generally recommended process for the incorporation of the RA into part A of a paint was followed by adding an initial charge of resin, solvent and RA to a mix tank. This mixture is then pre-dispersed at 15-20 m/s for a specified amount of time. After this pre-dispersion step, titanium dioxide R-900 pigment and leveling agent were added and then the mixture was further dispersed at 15-25 m/s and at a specified batch temperature and time so an acceptable "Fineness of Grind" is achieved. The batch temperature was actively controlled at either 50° C. or 65° C. to simulate paint production in a manufacturing plant.

TABLE 4

High solids two component polyurethane paint formulation.

| | Component Supplier | Parts by Wt. |
|---|---|---|
| Component A | | |
| Acrylic Polyol in Butyl Acetate | BASF (modified rapid property development acrylic polyol, 80% solids in Butyl Acetate, Eq. Wt = 400 g/mol; OH number = 135-150) | 31.43 |
| Solvent (Methyl Amyl Ketone) | Various | 16.37 |
| Levelling aid | BASF | 0.16 |
| Rheological additive (RA) | Various | 1.02 |
| TiO₂ filler | Chemours (R-900 or easily dispersable TS-6200) | 39.33 |
| Component B (Curative) | | |
| Isocyanate curing agent | Bayer (aliphatic, 100% solids Eq. Wt. = 183 g/mol; 23% NCO) | 11.69 |

The ability of the polyamide to control paint rheology was assessed by means of sag resistance measurement in mils using a Leneta Sag multi notch applicator at room temperature in accordance with ASTM D4400. Results for the two component A+B cured urethane paints are shown in Table 5. The HSA-ED-HA (1) polyamide does not effectively control the rheology when incorporated at 50° F. in part A as the amide is not activated into the active form at this temperature. This particular amide requires paint processing at 65° C. In contrast, the HSA-ED-PA (1) additive shows good activation at the lower 50° C. processing temperature.

TABLE 5

Leneta SAG (mils) for 77% solids urethane coating, MAK/BA solvent.

| | Paint process temperature | |
|---|---|---|
| Polyamide additive | 50° C. | 65° C. |
| HSA-ED-HA (1) | 11 | 40 |
| HSA-ED-PA (1) | 44 | 45 |

Example 9

High solids polyurethane paint part A preparation was initiated at ambient paint processing temperatures. The formulation shown in Table 4 was followed and the RA loading level for all RA's (HSA-ED-HA (1) and HSA-ED-AA (1)) evaluated was 1.3% based on total solids of the A+B mixed paint. An easily dispersible pigment TS-6200 was used and pigment grinding was done for 30 minutes at 9.4 m/s which is a relatively low dispersion speed. This formula benefits from a type of TiO$_2$ which is easily dispersible at low mix speeds. No heat was added to the paint mix pots during mixing. Batch temperatures were measured at the end of the dispersing step and it was found that this low shear rate dispersion only raised the temperatures of the batches up to 26° C.-30° C., which is a marginal increase above ambient temperature. Another set of paints were prepared as per Example 8 for the two polyamide additives but the paint processing temperatures were controlled at 65° C. The ability of the polyamide to control paint rheology was assessed by means of sag resistance measurement in mils using a Leneta Sag multi notch applicator at room temperature in accordance with ASTM D4400. Results for the two component A+B cured urethane paints are shown in Table 6. In contrast to the HSA-ED-HA (1) control, the HSA-ED-AA (1) polyamide additive activated at ambient temperature showed excellent rheology control in terms of sag resistance. The HSA-ED-HA (1) control did not activate at this low temperature and required a 65° C. processing temperature for activation, however, this additive was not able to match the efficiency of the HSA-ED-AA (1) material.

TABLE 6

Leneta SAG (mils) for 77% solids urethane coating, MAK/BA solvent.

| Polyamide additive | Paint process temperature | |
|---|---|---|
| | Ambient (26° C.-30° C.) | 65° C. |
| HSA-ED-HA (1) | 13 | 40 |
| HSA-ED-AA (1) | 80 | 80 |

Example 10

Polyamides were evaluated for performance as rheological additive (RA) by incorporating them in a high solids two component epoxy paint system with a formulation shown in Table 7. A generally recommended process for incorporation of the RA into part A of a paint was followed by adding an initial charge of resin, solvent and RA to a mix tank. This mixture is then pre-dispersed at 15-20 m/s for a specified amount of time. After this pre-dispersion step, pigment and other additives were added and then the mixture was further dispersed at 15-25 m/s and at a specified batch temperature and time so an acceptable "Fineness of Grind" is achieved. The batch temperature was actively controlled at either 50° C. or 65° C. to simulate paint production in a manufacturing plant.

TABLE 7

High solids two component epoxy paint formulation.

| Component | Supplier | Parts by Wt. |
|---|---|---|
| Component A | | |
| Bis-A Epoxy resin | Miller Stephenson (EEW = 187.5 g/mol) | 23.52 |
| Epoxy reactive diluent | Cardolite (alkylphenol glycidyl ether; EEW = 490 g/mol) | 0.65 |
| Epoxy reactive diluent | Air Products (neopentyl glycol diglycidyl ether; EEW = 137.5 g/mol) | 1.97 |
| Rheological additive (RA) | Various | 0.90 |
| Solvent | Various | 9.68 |

TABLE 7-continued

High solids two component epoxy paint formulation.

| Component | Supplier | Parts by Wt. |
|---|---|---|
| TiO$_2$ filler | Chemours | 6.77 |
| Talc filler | Imerys | 8.39 |
| Sodium potassium aluminosilicate filler | Unimin | 6.77 |
| Anti-corrosion pigment | Heubach (zinc containing filler) | 1.67 |
| Calcium silicate filler | NYCO (epoxy surface functionalized filler) | 7.62 |
| BaSO$_4$ filler | Cimbar | 14.39 |
| Defoamer | Elementis Specialties (non-silicone aliphatic) | 0.31 |
| Colorant | Elementis Specialties (black pigment dispersion) | 0.13 |
| Component B (Curative blend) | | |
| Amine curing agent | Cardolite (phenalkamine; AHEW = 132 g/mol) | 11.49 |
| Amine curing agent | BASF (C18 unsaturated fatty acid amidoamine; AHEW = 95 g/mol) | 5.74 |

The ability of the polyamide to control paint rheology was assessed by means of sag resistance measurement in mils using a Leneta Sag multi notch applicator at room temperature in accordance with ASTM D4400. Results for the two component A+B cured epoxy paints are shown in Table 8.

TABLE 8

Leneta SAG (mils) for 90% solids epoxy coating, iso-butanol solvent.

| Polyamide additive | Paint processing temperature | SAG (mils) |
|---|---|---|
| HSA-ED-HA (1) | 65° C. | 37 |
| HSA-ED-HA (1) | 50° C. | 23 |
| HSA-ED-PA (1) | 50° C. | 73 |
| HSA-ED-AA (1) | 50° C. | 75 |

The control HSA-ED-HA (1) polyamide composition does not show effective activation at lower paint preparation temperature, while the HSA-ED-PA (1) and HSA-ED-AA (1) polyamide compositions do show good activation and rheology control by means of sag resistance testing of paints prepared at lower processing temperatures.

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A curable sealant or adhesive composition comprising:
   a resin;
   a catalyst or curing agent;
   optional solvent, pigment, filler, and plasticizer; and
   a polyamide composition consisting essentially of a polyamide having groups derived from:
   a diamine selected from the group consisting of ethylene diamine and hexamethylene diamine;
   a straight chain monocarboxylic acid having 1 to 5 carbon atoms; wherein the straight chain monocarboxylic acid is independently selected from the group consisting of: acetic acid, propionic acid, and combinations thereof; and a fatty acid independently selected from the group consisting of: 12-hydroxystearic acid, lesquerolic acid and combinations thereof;

wherein the diamine, the straight chain monocarboxylic acid and fatty acid have a molar ratio range selected from the group consisting of: ranging from 1:1.75: 0.25 to 1:0.75:1.25; or ranging from 1:1.5:0.5 to 1:1:1; and said polyamide composition having a median particle size ranging from 1 μm to 10 μm, wherein the polyamide composition has an activation temperature ranging between 25° C. and 50° C., when combined with the resin, and optional pigment, filler and plasticizer, and wherein the curable sealant or adhesive composition is a one part system or a two part system.

2. The curable sealant or adhesive composition according to claim 1, wherein the resin is selected from silicone, polyurethane systems, acrylic, butyl rubber solvent based resin, epoxy-penetrating solvent-based resin, and combinations thereof.

3. The curable sealant or adhesive composition according to claim 1, wherein the resin is selected from a silyl-terminated polymer independently selected from the group consisting of: silylated polyurethane, silylated polyether polyol, silylated polyester and combinations thereof.

4. The curable sealant composition according to claim 1, wherein the curable sealant composition is a one part system and is moisture curable.

5. A method of making a curable sealant or adhesive composition comprising the steps of:

adding a polyamide composition to a resin and catalyst mixture;

blending the mixture of the polyamide and the resin and catalyst mixture at a temperature ranging between 25° C. and 50° C.;

wherein the polyamide composition consisting essentially of a polyamide having groups derived from:

a diamine selected from the group consisting of ethylene diamine and hexamethylene diamine;

a straight chain monocarboxylic acid having 1 to 5 carbon atoms; wherein the straight chain monocarboxylic acid is independently selected from the group consisting of: acetic acid, propionic acid, and combinations thereof; and a fatty acid independently selected from the group consisting of: 12-hydroxystearic acid, lesquerolic acid and combinations thereof;

wherein the diamine, the straight chain monocarboxylic acid and fatty acid have a molar ratio range selected from the group consisting of: ranging from 1:1.75: 0.25 to 1:0.75:1.25; or ranging from 1:1.5:0.5 to 1:1:1; and said polyamide composition having a median particle size ranging from 1 μm to 10 μm.

6. The method of making a curable sealant or adhesive according to claim 5, wherein the resin is selected from silicone, polyurethane systems, acrylic, butyl rubber solvent based resin, epoxy-penetrating solvent-based resin , and combinations thereof.

7. The method of making a curable sealant or adhesive according to claim 5, wherein the resin is a silyl-terminated polymer independently selected from the group consisting of: silylated polyurethane, silylated polyether polyol, silylated polyester and combinations thereof.

8. The polyamide composition of according to claim 1, wherein the diamine is ethylene diamine, the straight chain monocarboxylic acid is acetic acid and the fatty acid is 12-hydroxystearic acid.

9. The polyamide composition of according to claim 1, wherein the diamine is ethylene diamine, the straight chain monocarboxylic acid is propionic acid and the fatty acid is 12-hydroxystearic acid.

* * * * *